US008383280B2

(12) United States Patent  
Niroumand

(10) Patent No.: US 8,383,280 B2  
(45) Date of Patent: Feb. 26, 2013

(54) FUEL CELL SEPARATOR PLATE WITH INTEGRATED HEAT EXCHANGER

(76) Inventor: Amir Niroumand, Vancouver (CA)

( * ) Notice: Subject to any disclaimer, the term of this patent is extended or adjusted under 35 U.S.C. 154(b) by 704 days.

(21) Appl. No.: 12/540,309

(22) Filed: Aug. 12, 2009

(65) Prior Publication Data

US 2010/0040924 A1 Feb. 18, 2010

Related U.S. Application Data

(60) Provisional application No. 61/136,107, filed on Aug. 12, 2008.

(51) Int. Cl.
*H01M 8/02* (2006.01)
(52) U.S. Cl. .......................... 429/434; 429/457; 429/518
(58) Field of Classification Search .................. 429/434, 429/439, 457, 518, 519
See application file for complete search history.

(56) References Cited

U.S. PATENT DOCUMENTS

| | | | |
|---|---|---|---|
| 6,183,897 B1 | 2/2001 | Hartvigsen et al. | |
| 6,541,147 B1 | 4/2003 | McLean et al. | |
| 6,638,657 B1 | 10/2003 | Cisar et al. | |
| 7,220,507 B2 | 5/2007 | Liu et al. | |
| 7,727,659 B2* | 6/2010 | Diez | 429/434 |
| 2001/0006745 A1* | 7/2001 | Bronoel et al. | 429/32 |
| 2002/0043402 A1 | 4/2002 | Juskey et al. | |
| 2002/0155333 A1* | 10/2002 | Fitts et al. | 429/26 |
| 2003/0180598 A1* | 9/2003 | Fischer et al. | 429/34 |
| 2004/0224190 A1 | 11/2004 | Sasahara et al. | |
| 2005/0158608 A1 | 7/2005 | Shu et al. | |
| 2005/0260473 A1 | 11/2005 | Wang | |
| 2006/0040170 A1 | 2/2006 | Liu et al. | |
| 2006/0121328 A1 | 6/2006 | Liu et al. | |
| 2006/0199054 A9* | 9/2006 | Gallagher et al. | 429/26 |
| 2007/0051631 A1 | 3/2007 | Hartnack et al. | |
| 2007/0065697 A1 | 3/2007 | Shu et al. | |
| 2008/0032169 A1 | 2/2008 | Fabian et al. | |
| 2008/0087406 A1 | 4/2008 | Asfia et al. | |

FOREIGN PATENT DOCUMENTS

FR 2836285 8/2003

* cited by examiner

*Primary Examiner* — Stephen J. Kalafut
(74) *Attorney, Agent, or Firm* — Klarquist Sparkman, LLP

(57) ABSTRACT

A fuel cell separator plate having a planar substrate having a main body with first and second opposed major surfaces, a first open channel reactant flow field recessed in the first major surface, and a first segment extending from the main body, and a thermally and electrically conductive first current collector layer having a flow field portion on the first major surface of the main body and a heat exchange portion extending from the flow field portion onto the first segment such that heat in the flow field portion conducts to the heat exchange portion during fuel cell use.

9 Claims, 15 Drawing Sheets

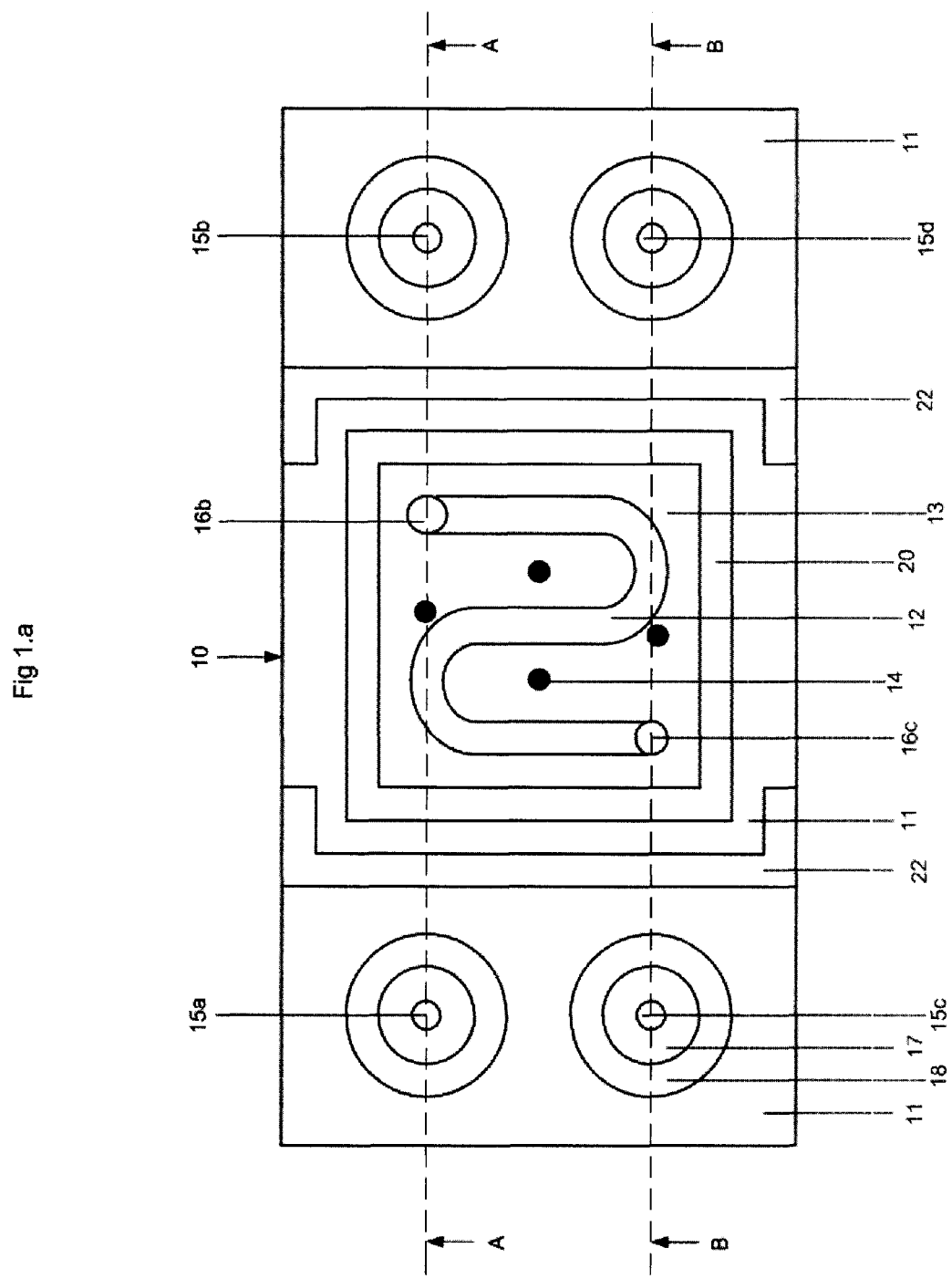

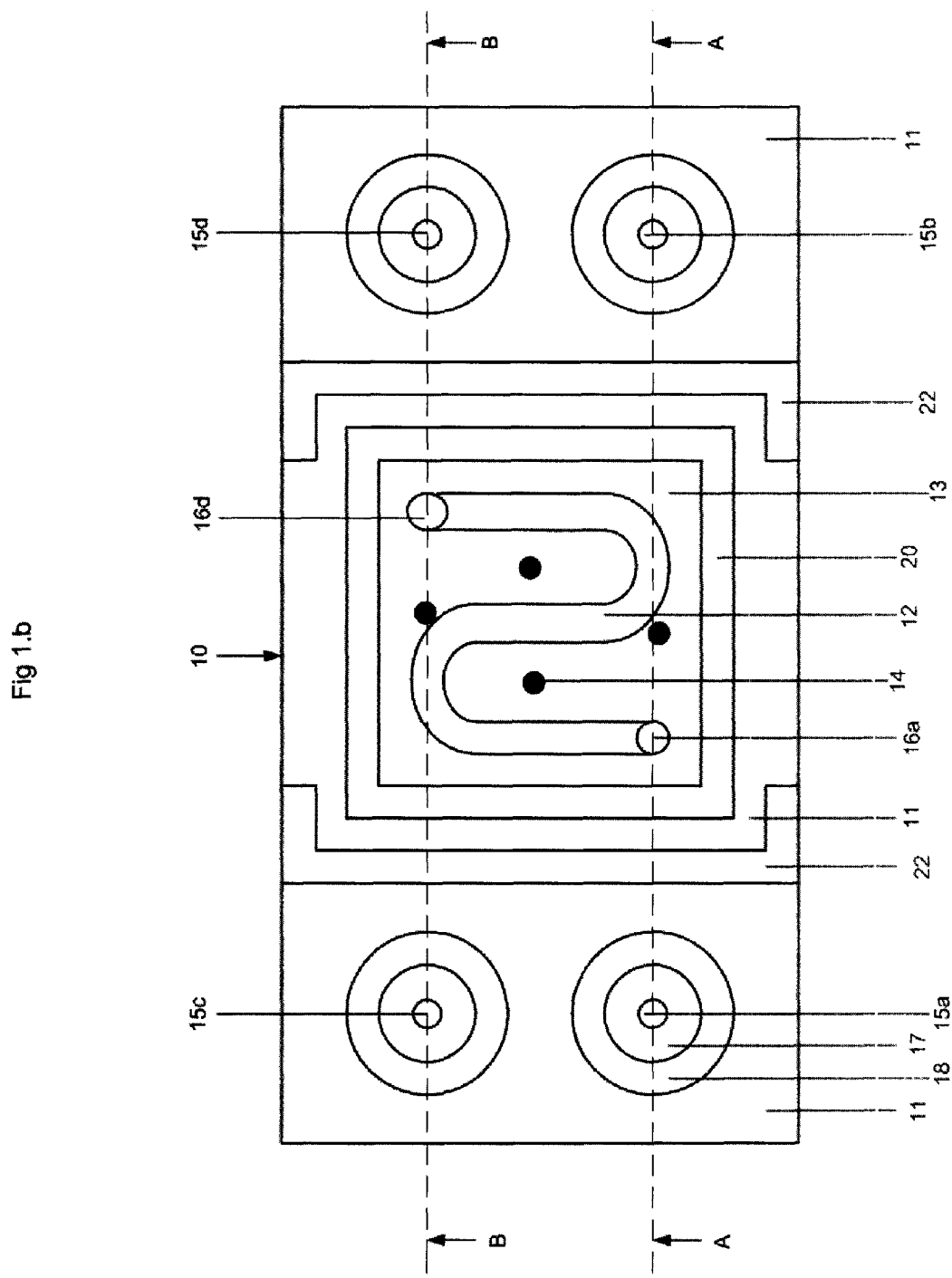

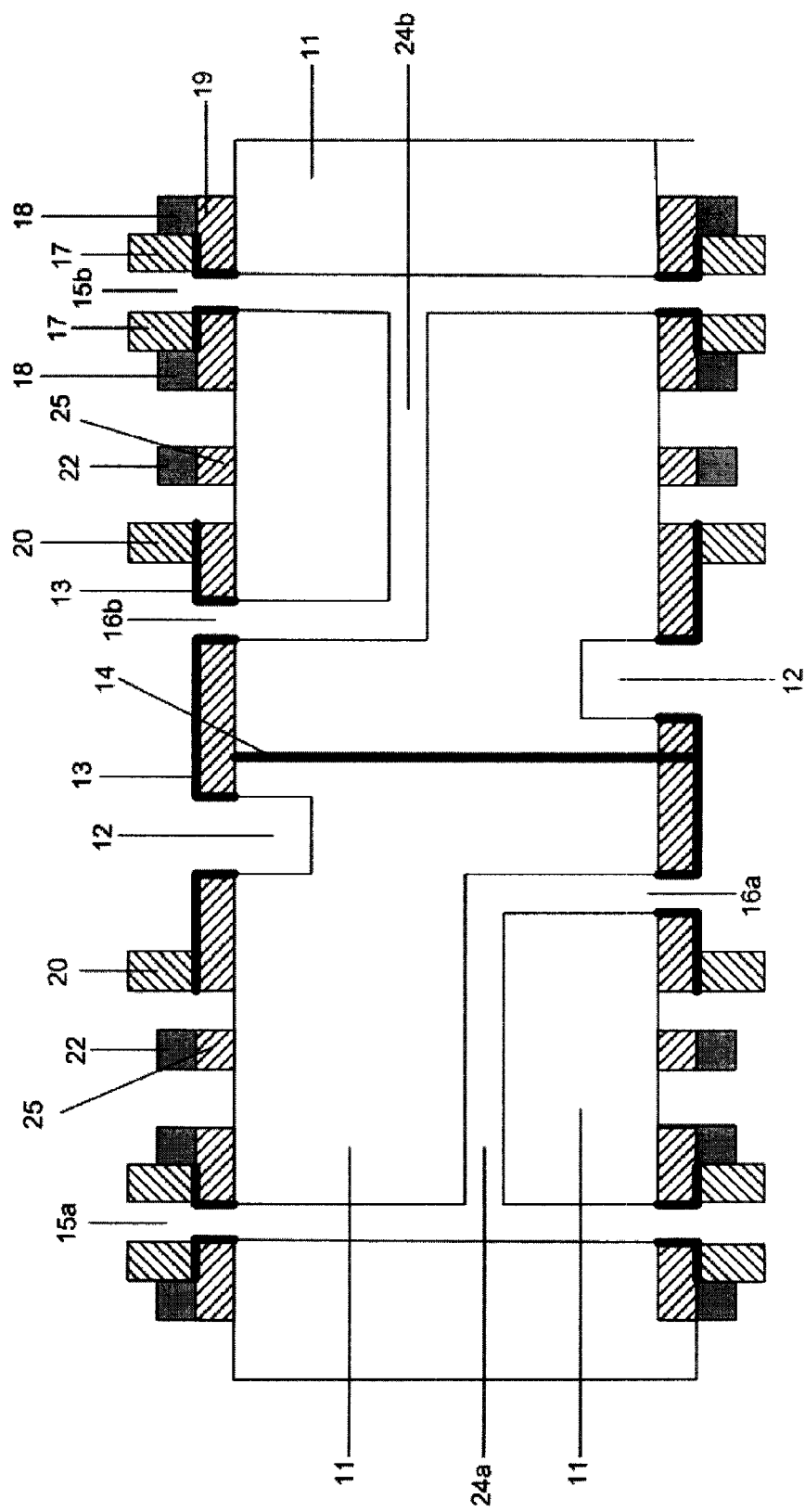
Fig 2.a

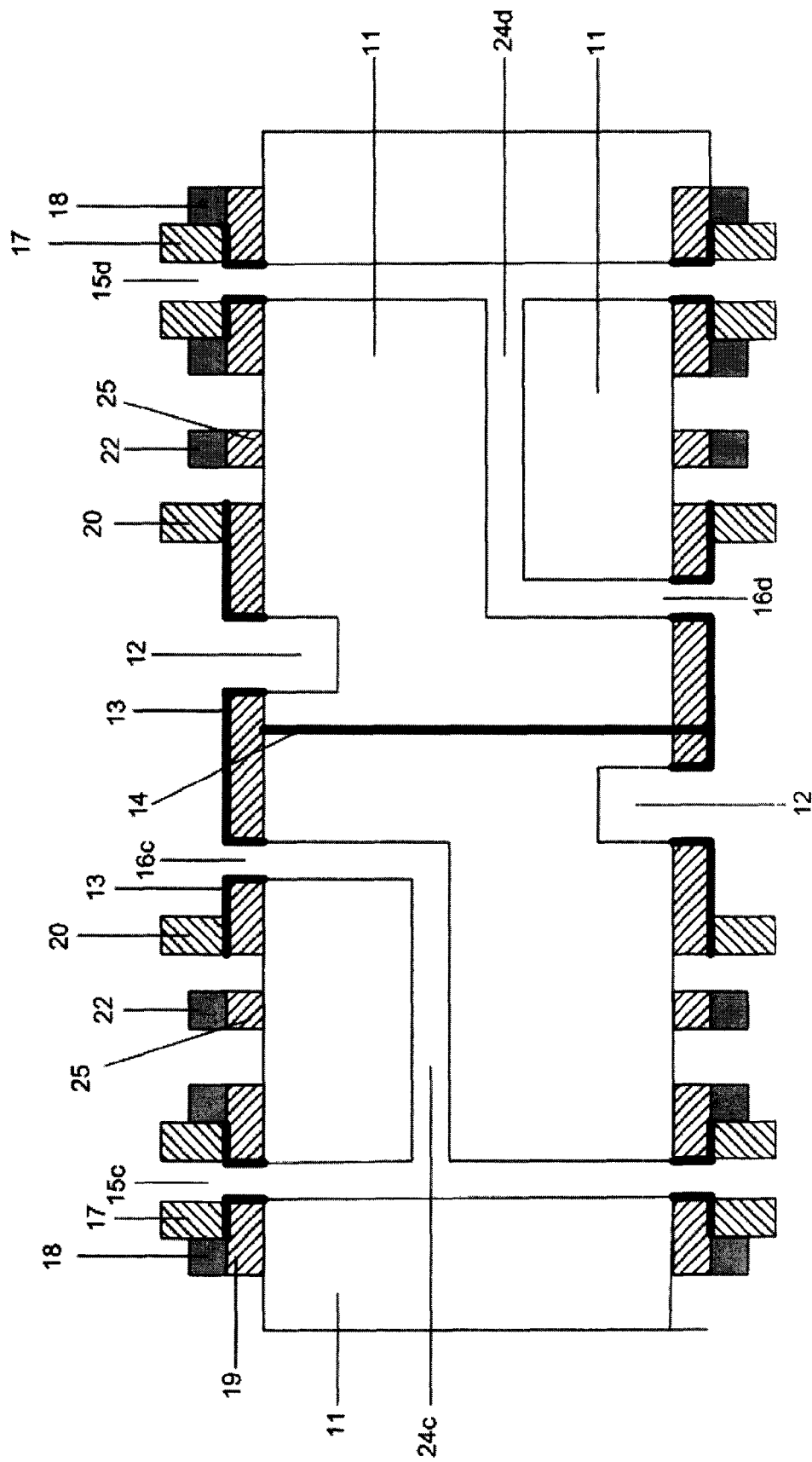
Fig 2.b

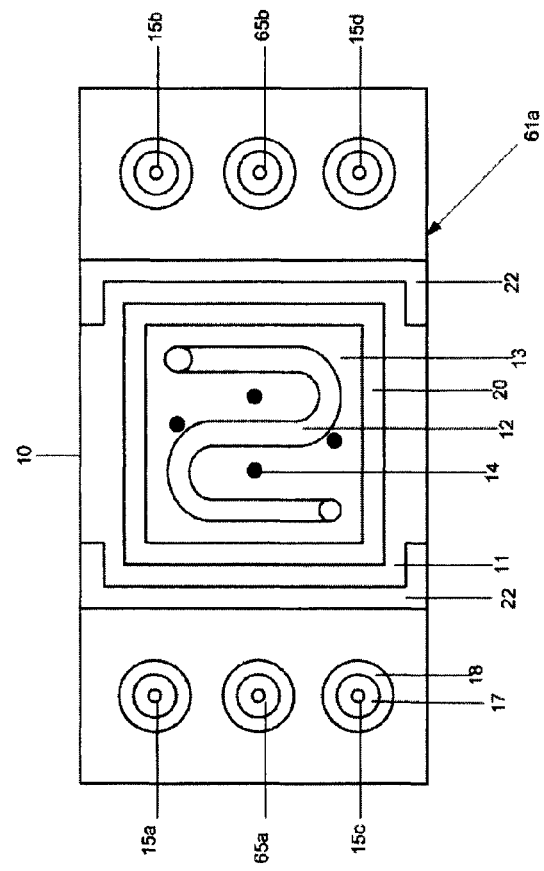
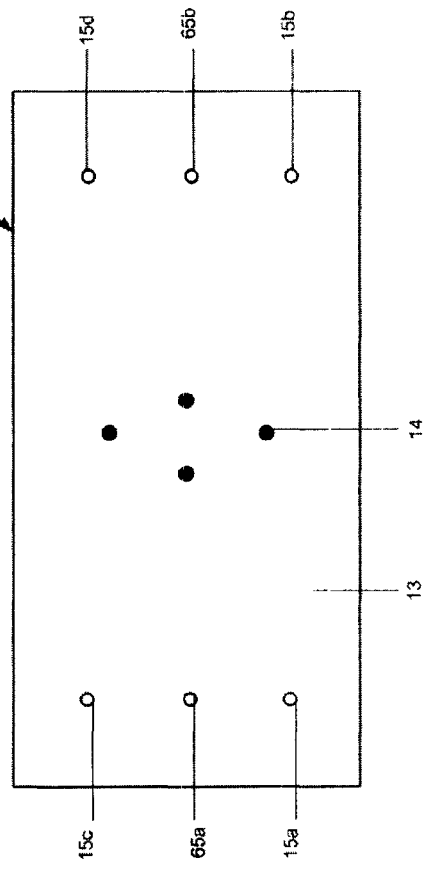
Fig 8.a
Fig 8.b

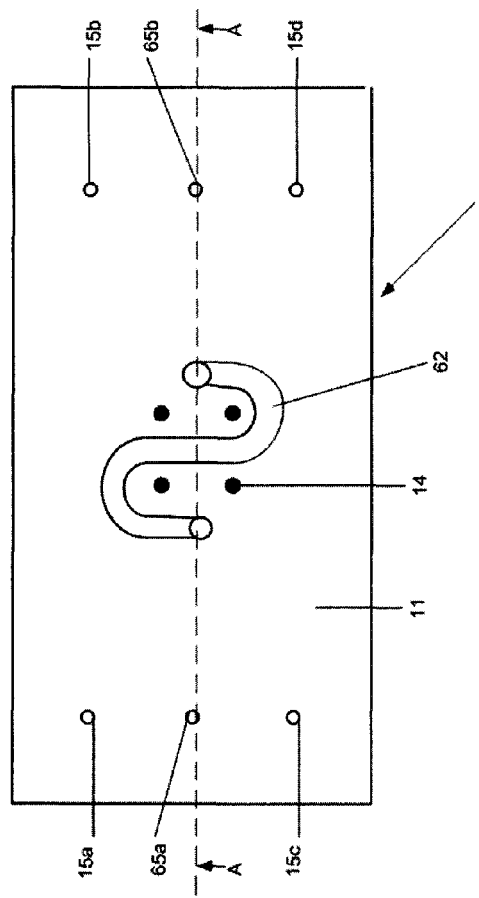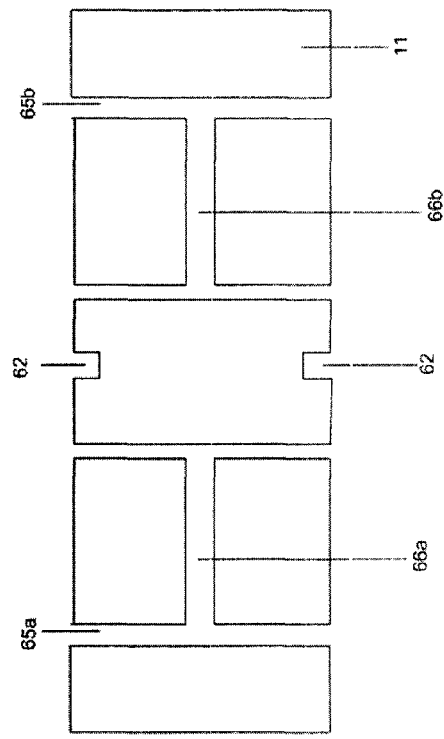

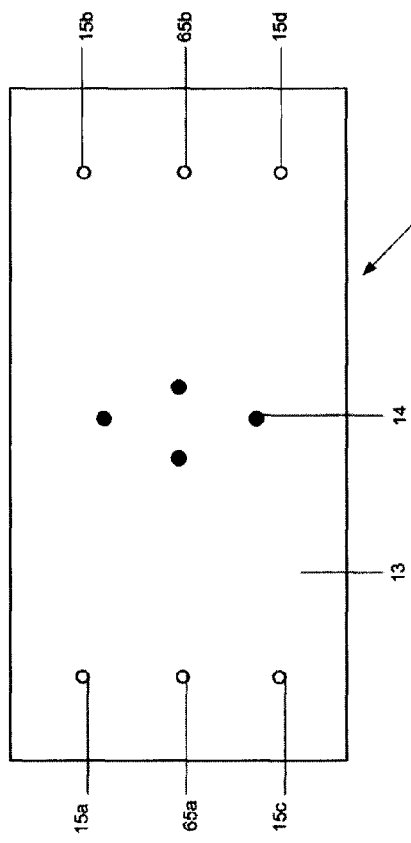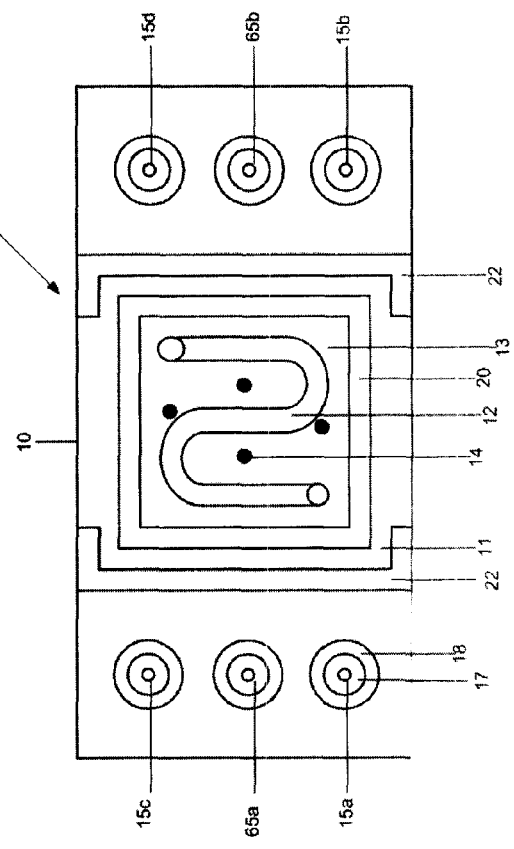

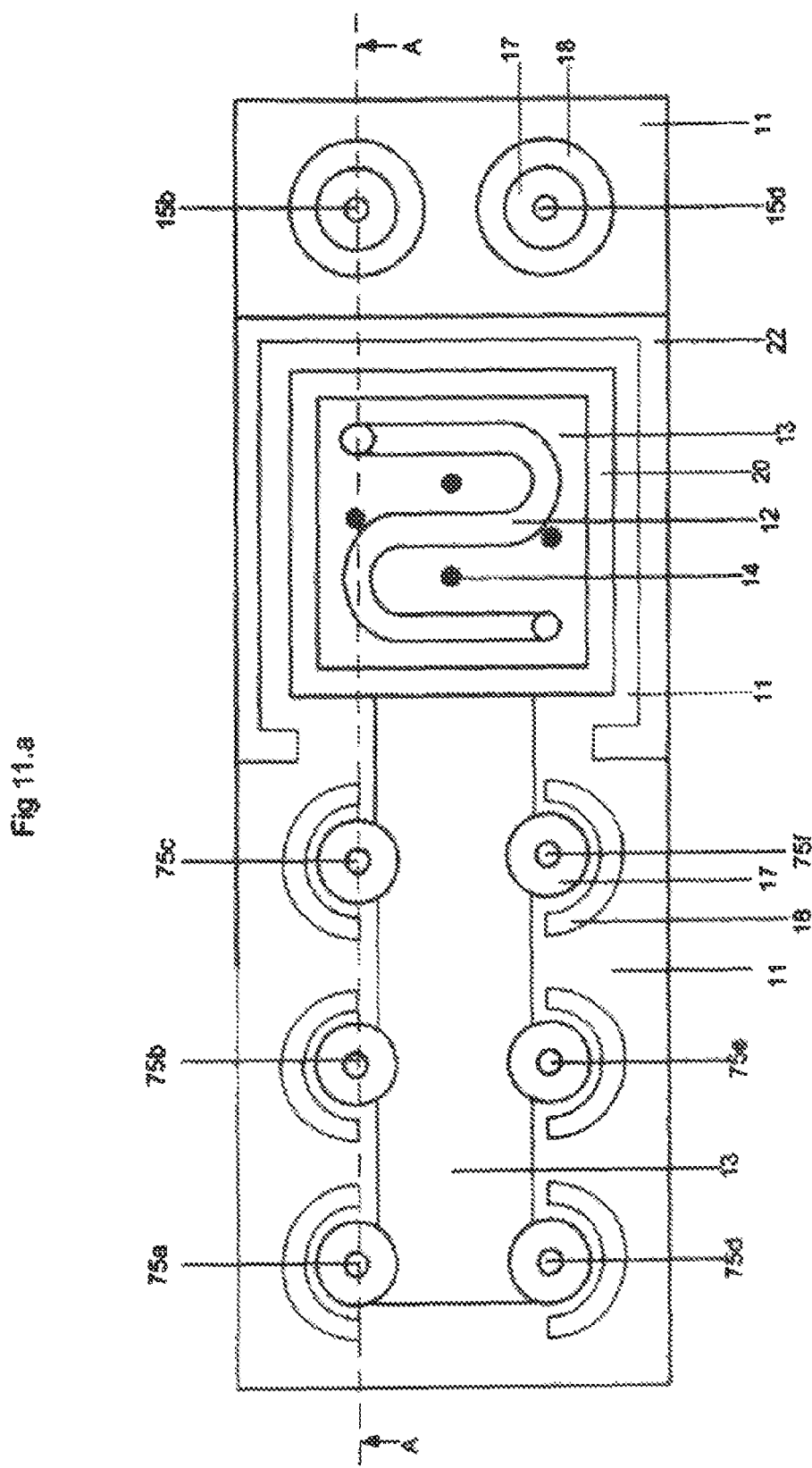

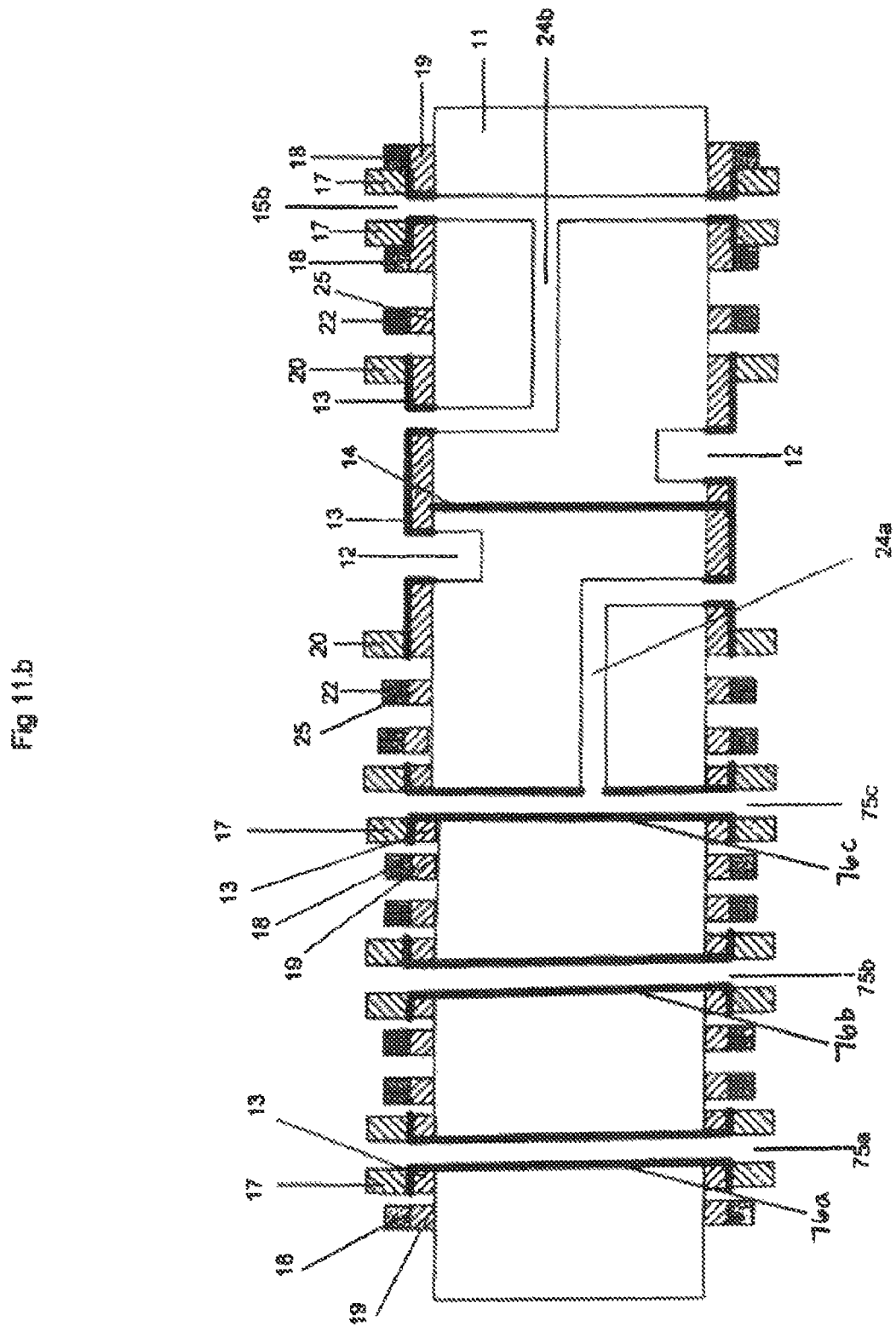

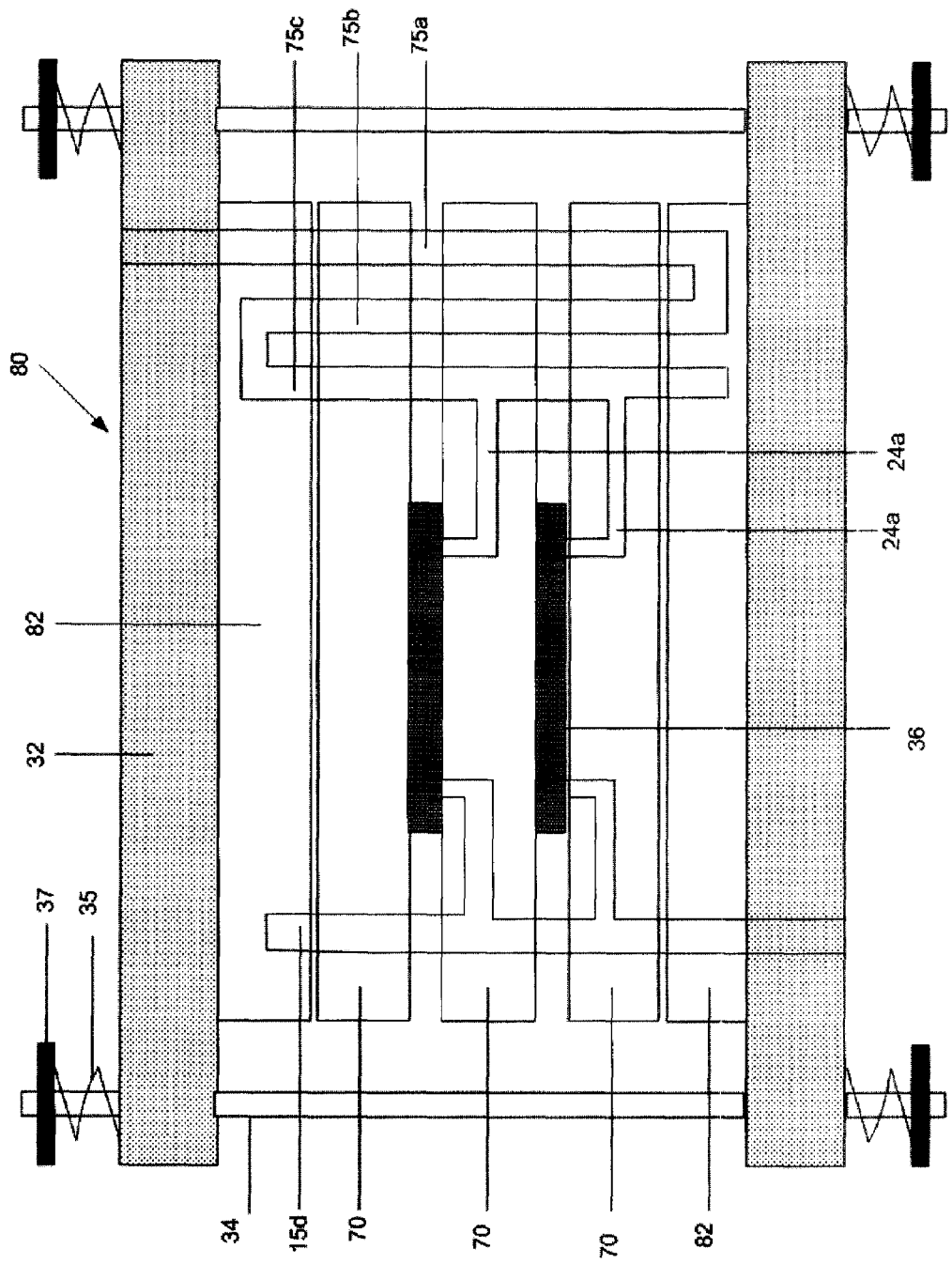

United States Patent US 8,383,280 B2

FUEL CELL SEPARATOR PLATE WITH INTEGRATED HEAT EXCHANGER

CROSS REFERENCE TO RELATED APPLICATION

This application claims the benefit of U.S. Provisional Application No. 61/136,107, filed Aug. 12, 2008, which is incorporated herein by reference.

FIELD

The present invention relates to an integrated fuel cell heat exchanger, and in particular to a fuel cell heat exchanger integrated into a printed circuit board separator plate.

BACKGROUND

PEM (Polymer Electrolyte Membrane/Proton Exchange Membrane) fuel cells are electrochemical cells that use hydrogen/hydrocarbon and air/oxygen (collectively "reactants") to produce water, electricity and heat through an electrochemical reaction.

PEM fuel cells are generally comprised of a MEA (Membrane Electrode Assembly) sandwiched between two separator plates. The MEA is comprised of a proton exchange membrane buffered by two catalyst layers (anode and cathode) and two electrodes (anode and cathode). The proton exchange membrane serves as an electrolyte that conducts hydrogen ions and block electrons; the electrodes serve as electrical terminals that conduct reactants and electrons; and the catalyst layers serve to promote the electrochemical reaction. The separator plates are typically graphite plates that provide structural support, as well as, external access to coolant and reactant inlets/outlets and electrical terminals. Each separator plate contains flow fields or channels etched into the separator plate which serve to deliver reactants to the MEA.

In operation, reactants are supplied through the flow fields of the separator plates to the electrodes. The reactants are then diffused through the electrodes to the catalyst layers. At the anode catalyst layer, hydrogen is split into electrons and protons. The electrons are transported through the anode electrode and the anode separator plate to external circuitry, and return through the cathode electrode to the cathode catalyst layer. The protons are transported through the proton exchange membrane and the cathode catalyst layer, at which point they combine with electrons and oxygen in the cathode electrode to produce water. The water is then transported out of the cathode electrode through the cathode diffusion layer and flow field of the separator plate.

In order to increase output power, a number of PEM fuel cells can be placed in series to form a fuel cell stack. In the fuel cell stack, the separator plates contain flow fields engraved on both sides of the separator plate—one flow field carries hydrogen to the MEA of a first fuel cell while the other flow field carries oxygen to the MEA of a second fuel cell. Since the graphite separator plates are conductive, adjacent fuel cells are electrically connected in series.

The electrochemical reaction produces a substantial amount of heat as a result of losses and inefficiencies in the fuel cell. In order to achieve optimal operating conditions, the fuel cell stack temperature should be maintained within a specified range (typically around 80° C.) that is dictated by design parameters, such as, the MEA properties. Too high temperatures will result in elevated evaporation rates that will dry the MEA, while too low temperatures will slow the electrochemical reaction. To maintain the fuel cell stack at a desired temperature, the excess heat produced from the electrochemical reaction can be removed from the fuel cell stack. To remove the heat produced from the electrochemical reaction coolant may be introduced to the fuel cell stack through a third flow field built into the separator plates. For low power fuel cell stacks (up to a few kilowatts of output power) this coolant can be air. For higher power fuel cell stacks a liquid coolant such as water is typically used. The coolant is circulated in the fuel cell stack to remove heat and is then transported to a heat exchanger where the heat is dissipated from the coolant. The coolant may then be re-circulated back into the fuel cell stack. The use of liquid coolant requires additional components (such as, a heat exchanger, coolant, piping, and control systems) that add to the system size, weight and cost. In addition, the graphite separator plates used in typical PEM fuel cells are heavy and brittle and are not suitable for mass manufacturing purposes.

SUMMARY

It is an object of the invention to provide a solution to at least some of the deficiencies or problems in prior art approaches to conducting heat from fuel cell separator plates.

According to one aspect of the invention, there is provided a fuel cell separator plate comprising: a first substrate with a composition selected for the first substrate to serve as a thermal and electrical insulator during fuel cell use; first and second current collector layers respectively attached to opposed surfaces of the substrate and each with a composition selected for the current collector layers to serve as a thermal and electrical conductor during fuel cell use; an open-channel reactant flow field recessed into the separator plate and in contact with the first current collector layer, thermally and electrically conductive vias extending between the current collector layers and through the thickness of the substrate; and a thermally conductive second substrate having a fluid channel in fluid communication with the second current collector layer such that fluid flowing through the fluid channel is heatable by heat conducted to the second current collector layer from the vias.

According to another aspect of the invention, there is provided a fuel cell separator plate comprising: a substrate with a composition selected for the substrate to serve as a thermal and electrical insulator during fuel cell use; a current collector layer attached to a surface of the substrate and with a composition selected for the current collector layer to serves as a thermal and electrical conductor during fuel cell use; an open-channel reactant flow field recessed into the separator plate and in contact with the current collector layer; and a manifold having a bore extending through the separator plate and a conductive lining around the bore and in contact with the current collector layer such that fluid flowing through the manifold is heatable by heat conducted to the lining from the flow field.

According to another aspect of the invention there is provided a fuel cell separator plate comprising: a planar substrate comprising a main body having first and second opposed major surfaces, a first open channel reactant flow field recessed in the first major surface, and a first segment extending from the main body; and a thermally and electrically conductive first current collector layer having a flow field portion on the first major surface of the main body and a heat exchange portion extending from the flow field portion onto the first segment such that heat in the flow field portion conducts to the heat exchange portion during fuel cell use; wherein the materials and dimensions of the substrate are selected to provide sufficient mechanical support for the separator plate during fuel cell use and to serve as a thermal and electrical insulator. The first segment may comprise a plurality of segments extending from the main body. In addition, the flow field portion of the first current collector layer may be comprised of a different material composition than the heat exchange portion of the first current collector layer. Further, conductive vias may extend through the thickness of the main body in electrical and thermal connection with the flow field portion of the first current collector layer.

The separator plate may further comprise a second open channel reactant flow field forming part of the substrate and recessed in the second major surface of the main body; and a thermally and electrically conductive second current collector layer having a flow field portion on the second major surface of the main body and a heat exchange portion extending from the flow field portion onto the first segment such that heat in the flow field portion conducts to the heat exchange portion during fuel cell use. The first and second segments may comprise a plurality of segments extending from the main body. In addition, the flow field portion of the first and second current collector layers may be comprised of a different material composition than the heat exchange portion of the first and second current collector layers. Further, conductive vias may extend through the thickness of the main body in electrical and thermal connection with the flow field portions of the first and second current collector layers.

Alternatively, the separator plate may further comprise a second open channel reactant flow field forming part of the substrate and recessed in the second major surface of the main body, and a second segment forming part of the substrate and extending from the main body; and a thermally and electrically conductive second current collector layer having a flow field portion on the second major surface of the main body and a heat exchange portion extending from the flow field portion onto the second segment such that heat in the flow field portion conducts to the heat exchange portion during fuel cell use. The first and second segments may each have a thickness less than the thickness of the main body and the first segment may have a major surface that is co-planar with the first major surface of the main body and the second segment may have a major surface that is co-planar with the second major surface of the substrate, such that when the planar substrate is stacked adjacent to another planar substrate a space is formed in a stack direction between overlapping segments of the two substrates.

The first and second segments may extend from the main body in opposite directions. Alternatively, the first and second segments may extend from the main body in the same direction and the dimensions of the first and second segments may be selected such that the first and second segments are non-overlapping in the stack direction. The first and second segments may also comprise a plurality of segments extending from the main body. In addition, the flow field portion of the first and second current collector layers may be comprised of a different material composition than the heat exchange portion of the first and second current collector layers. Further, conductive vias may extend through the thickness of the main body in electrical and thermal connection with the flow field portions of the first and second current collector layers.

The foregoing and other objects, features, and advantages of the invention will become more apparent from the following detailed description, which proceeds with reference to the accompanying figures.

BRIEF DESCRIPTION OF THE DRAWINGS

FIG. 1a is a top plan view of a separator plate for a fuel cell.

FIG. 1b is a bottom plan view of the separator plate shown in FIG. 1a.

FIG. 2a is a front cross-sectional view cut through line A of the separator plate shown in FIG. 1a.

FIG. 2b is a front cross-sectional view cut through line B of the separator plate shown in FIG. 1a.

FIG. 3 is a front view of a fuel cell stack comprised of a plurality of separator plates shown in FIG. 1a.

FIG. 8a is a top plan view of the first portion of the separator plate shown in FIG. 7.

FIG. 8b is a bottom plan view of the first portion of the separator plate shown in FIG. 7.

FIG. 9a is a top plan view of the third portion of the separator plate shown in FIG. 7.

FIG. 9b is a front cross-sectional view cut through line A of the third portion of the separator plate shown in FIG. 9a.

FIG. 10a is a top plan view of the second portion of the separator plate shown in FIG. 7.

FIG. 10b is a bottom plan view of the second portion of the separator plate shown in FIG. 7.

FIG. 11a is a top plan view of a separator plate for a fuel cell with an integrated heat exchange manifold.

FIG. 11b is a front cross-sectional view cut through line A of the separator plate shown in FIG. 11a.

FIG. 12 is a front cross-sectional view of a fuel cell stack comprised of a plurality of separator plates as shown in FIG. 11a.

DETAILED DESCRIPTION

Figure 3:
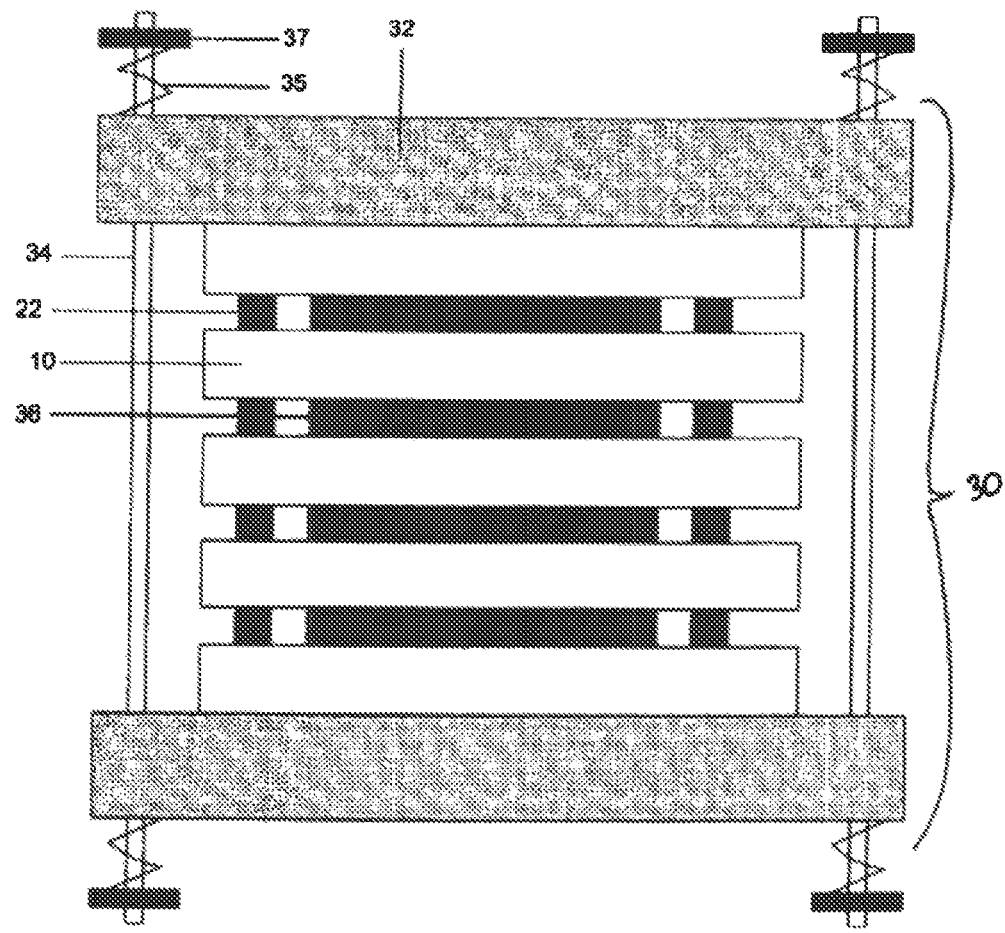

The embodiments of the present invention relate to a separator plate for a fuel cell with an integrated heat exchanger manufactured using printed circuit board (PCB) technology PCB Separator Plate Referring to FIGS. 1a, 1b, 2a and 2b, a separator plate 10 is shown that is manufactured using well established printed circuit board (PCB) technology (see "Development of a portable fuel cell array with printed circuit technology", R. O'Hayre, Journal of Power Sources, 124 (2), 2003, pp 459-72, and "Stability of planar PEMFC in printed circuit board technology", A. Schmitz, Journal of Power Sources, 127(1-2), 2004, 197-205, for application of PCB technology to fuel cell separator plates).

The main body of separator plate 10 is comprised of a planar substrate 11 that provides sufficient mechanical support for separator plate 10 when used in a fuel cell. It is a thermal and electrical insulator comprised of epoxy and glass fibre and having a thickness of approximately one millimeter. Alternatively, substrate 11 may be constructed of other thermally and electrically insulative materials having different thicknesses such that sufficient mechanical support for the separator plate 10 is provided. For example, the substrate 10 may be comprised of the combination of one or more of epoxy, phenolic paper, glass fibre, plastics, and prepregs, such as, polytetrafluoroethylene, FR-2 (Phenolic cotton paper), FR-3 (Cotton paper and epoxy), FR-4 (Woven glass and epoxy), FR-5 (Woven glass and epoxy), FR-6 (Matte glass and polyester), G-10 (Woven glass and epoxy), CEM-1 (Cotton paper and epoxy), CEM-2 (Cotton paper and epoxy), CEM-3 (Woven glass and epoxy), CEM-4 (Woven glass and epoxy), CEM-5 (Woven glass and polyester).

The separator plate 10 has a current collector layers 13 on first and second opposed major surfaces of the substrate 11 comprised of copper, nickel, and gold. Current collector layers 13 are formed by bonding a copper layer to substrate 11 using epoxy resin. A nickel layer is then deposited on the copper layer and a gold layer is deposited on the nickel layer using electroplating, chemical plating, or sputtering. The gold layer provides low contact resistance, remains stable in the high humidity conditions surrounding the MEA, and protects the copper layer from corrosion. The nickel layer further enhances contact resistance and reduces corrosion. The thickness of the copper layer is typically a few ounces per square foot and the thickness of the nickel layer and gold layer is typically a few microns. In the present embodiment, the thickness of the copper layer is one ounce per square foot, the nickel layer is 10 microns, and the gold layer is 5 microns. Alternatively, various combinations of suitable conductive materials may be used to form current collector layers 13, and various methods may be employed to bond the layers of the current collector layers 13 to one another and to substrate 11, all of which is known in the art of PCB manufacture. In the further alternative, various other layers may be positioned between the current collector layers 13 and the substrate 11.

Within each current collector layer 13 is a reactant flow field 12. Reactant flow fields 12 are formed by engraving one or more open channels into the surface of substrate 11 and etching away or not applying to substrate 11 the portion of current collector layer 13 that would otherwise cover the channels. Reactant flow fields 12 are adapted to carry reactants and are positioned on separator plate 10 so as to allow the reactants in reactant flow fields 12 to contact the MEA when the fuel cell is assembled. Reactants are delivered to and removed from reactant flow fields 12 as further described below. The reactant flow fields 12 are typically a few millimeters wide and deep, and a few meters long. In the present embodiment, the width of the flow fields 12 is two millimeters, the depth is 2 millimeters, and the length is three meters. Alternatively, the flow fields 12 can be plated with copper, nickel and/or gold and electrically and thermally coupled to the collector layer 13 in order to increase the rate of heat exchange between the reactants and the collector layer 13. The flow fields 12 can have a serpentine configuration with multiple turns; the two-turn flow field 12 shown in the figures is merely one of many configurations known to one skilled in the art.

Also within each current collector layer 13 are conductive vias 14. Conductive vias 14 span the thickness of substrate 11 and are coupled to current collector layers 13 so as to conduct heat and electricity between current collector layers 13 located on opposite sides of separator plate 10. Conductive vias 14 are formed by: drilling through substrate 11 and each current collector layer 13; filling the drilled hole with leadless solder; and plating the filled hole with nickel and gold. Alternatively, the drilled holes may be filled with one or more conductive materials, such as, copper, gold and nickel.

About the perimeter of each current collector layer 13 is an MEA sealing layer 20. Sealing layer 20 is composed of SU-8 photo resist/epoxy that is deposited on the current collector layer 13 about its perimeter. In an assembled fuel cell, sealing layer 20 serves to confine reactants within a volume defined by current collector layer 13 and reactant flow field 12, the MEA, and MEA sealing layer 20. Sealing layer 20 contacts the MEA on the proton exchange membrane about the perimeter of the catalyst layer. The thickness of MEA sealing layer 20 is typically around one millimeter and is selected such that when the fuel cell is assembled and compressed, the catalyst layer of the MEA resides within the perimeter of MEA sealing layer 20 without experiencing compression. In the present embodiment the MEA sealing layer is selected such that in an assembled fuel cell the MEA sealing layers 20 on anode and cathode separator plates collectively introduce an additional 0.5 millimeters to the thickness of the fuel cell under compression.

Separator plate 10 further comprises four main reactant manifolds (15a, 15b, 15c, and 15d) that run through the thickness of separator plate 10. The main reactant manifolds serve to: 1) provide reactants to the fuel cell and remove used reactants and by-products of the electrochemical reaction from the fuel cell, 2) provide reactants to similar main reactant manifolds of adjacent separator plates 10 and remove used reactants and by-products of the electrochemical reaction from similar main reactant manifolds of adjacent separator plates 10, and 3) interface with external reactant supply systems.

In particular, the main reactant manifolds provide reactants to and remove reactants from reactant flow fields 12 of separator plate 10 through internal reactant manifolds (24a, 24b, 24c, and 24d) that are in fluid communication with both the main reactant manifolds and reactant flow fields 12. In the present embodiment, main reactant manifold 15a provides fuel to reactant flow field 12 on the bottom side of separator plate 10 through internal reactant manifold 24a, while main reactant manifold 15d removes used fuel from reactant flow field 12 on the bottom side of separator plate 10 through internal reactant manifold 24d. Main reactant manifold 15c provides oxidant to reactant flow field 12 on the top side of separator plate 10 through internal reactant manifold 24c, while main reactant manifold 15b removes used oxidant and by-products from reactant flow field 12 on the top side of separator plate 10 through internal reactant manifold 24b.

The main reactant manifolds are formed by drilling holes through the thickness of substrate 11. The internal reactant manifolds are formed by constructing substrate 11 of two sub-layers. The internal reactant manifolds are engraved into the surface of the sub-layers so as to connect desired main reactant manifolds to desired reactant flow fields 12. The sub-layers are then bonded together using epoxy resin such that the internal reactant manifolds are contained within substrate 11. The internal reactant manifolds are then connected to the reactant flow fields 12 by drilling holes (16a, 16b, 16c, 16d) in substrate 11 at the beginning and end of reactant flow fields 12, such that the holes connect to the internal reactant manifolds but do not exit the opposite side of substrate 11. Alternatively, the internal reactant manifolds may be formed by drilling holes through the sides of substrate 11 so as to connect desired external manifolds and desired reactant flow fields 12. These holes are then plugged with epoxy resin to prevent reactants from escaping from separator plate 10. In the present embodiment, the diameter of the main reactant manifolds and internal reactant manifolds is one centimeter.

About the perimeter of each main reactant manifold is a manifold base layer 19 comprised of copper, nickel and gold. Manifold base layers 19 are formed by bonding a copper layer to substrate 11 using epoxy resin. A nickel layer is then deposited on the copper layer and a gold layer is deposited on the nickel layer using electroplating, chemical plating, or sputtering. Both the gold and nickel layers serve to reduce corrosion to the copper layer. The thickness of the copper layer is typically a few ounces per square foot and the thickness of the nickel layer and gold layer is typically a few microns. In the present embodiment, the thickness of the copper layer is one ounce per square foot, the nickel layer is 10 microns, and the gold layer is 5 microns.

Also about the perimeter of each main reactant manifold is a manifold sealing layer 17. Sealing layer 17 is composed of SU-8 photo resist/epoxy that is deposited on manifold base layer 19 about the perimeter of each main reactant manifold. In an assembled fuel cell, sealing layer 17 serves to seal the interface between similar main reactant manifolds in adjacent separator plates 10 and thereby preventing reactants, used reactants and by-products from escaping the fuel cell at the manifold interfaces.

In an assembled fuel cell, the MEA is compressed between two separator plates 10. Compression is necessary to effect the sealing functions of MEA sealing layer 20 and manifold sealing layers 17. When compressed, the sealing layers are elastically deformed providing a resistive force opposing compression which aids in the effectiveness of the seal. To maintain the compression and seal, adjacent separator plates 10 are bonded to one another by means of bonding layers. A manifold bonding layer 18, composed of leadless solder, is deposited on each manifold base layer 19 about the perimeter of each manifold sealing layer 17. In addition, a MEA bonding layer 22, comprised of copper and leadless solder is formed about the perimeter of MEA sealing layer 20; the copper is bonded to substrate 11 using an epoxy resin and the leadless solder is then deposited on the copper. During the construction of the fuel cell, the MEA is placed in between two separator plates 10 and within the perimeter of MEA bonding layer 22. The leadless solder of manifold bonding layers 18 and MEA bonding layer 22 are melted and then allowed to harden, thereby bonding together corresponding manifold base layers 19 and layers 25 and the copper portions of MEA bonding layer 22 of adjacent separator plates 10.

Referring to FIG. 3, a fuel cell stack 30 is shown comprising two end plates 32 and a plurality of MEAs 36 buffered by a plurality of separator plates 10. End plates 32 serve to structurally support and compress the plurality of separator plates 10 and MEAs 36, as well as, serve as connection points for external circuitry (not shown) and reactant supply systems (not shown). End plates 32 are manufactured using well established PCB technology and are comprised of epoxy and glass fibre. Each end plate 32 contains four holes drilled through the thickness of the plate near the four corners of the plate. Each hole accepts a compression rod 34 comprised of a long steel cylinder containing helical threading on the outer surface. Each compression rod 34 spans beyond the length of fuel cell stack 30 and passes through vertically aligned holes in the end plates 32. The ends of compression rods 34 extend beyond end plates 32 to accept a compression spring 35 and a compression bolt 37. Each compression spring 35 resides between the outer face of one of end plates 32 and compression bolt 37. Compression bolt 37 engages the threads of compression rod 34 allowing fuel cell stack 30 to be compressed by tightening the bolt.

It is to be understood while the embodiments of the PCB Separator Plate described above relate to a closed cathode architecture, the PCB Separator Plate can be modified to an open cathode architecture. For example, the separator plate 10 can be modified to an open cathode architecture by removing oxidant reactant manifolds 15b, 15c, 24b and 24c, and replacing oxidant reactant flow field 12 on the top side of separator plate 10 with an oxidant reactant flow field comprised of a plurality of channels extending to the periphery of the separator plate such that oxidant may enter and exit the channels from and to the outside of the separator plate 10.

Heat Exchange Fin

In an alternative embodiment, a PCB separator plate 40 with an integrated heat exchange fin is provided. Separator plate 40 is similar to separator plate 10 except as further described below.

Figure 4:
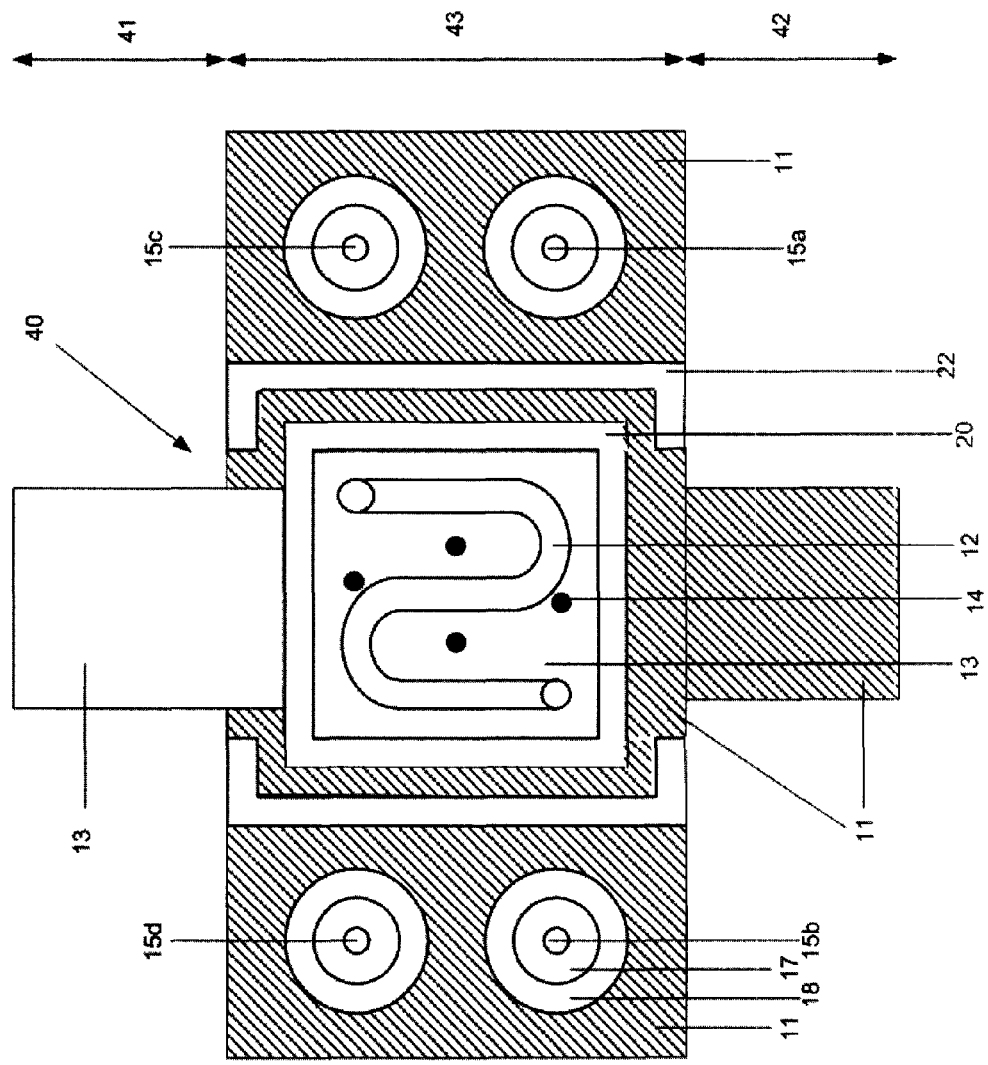
FIG. 4 is a top plan view of a separator plate for a fuel cell with an integrated heat exchange fin.
Figure 5:
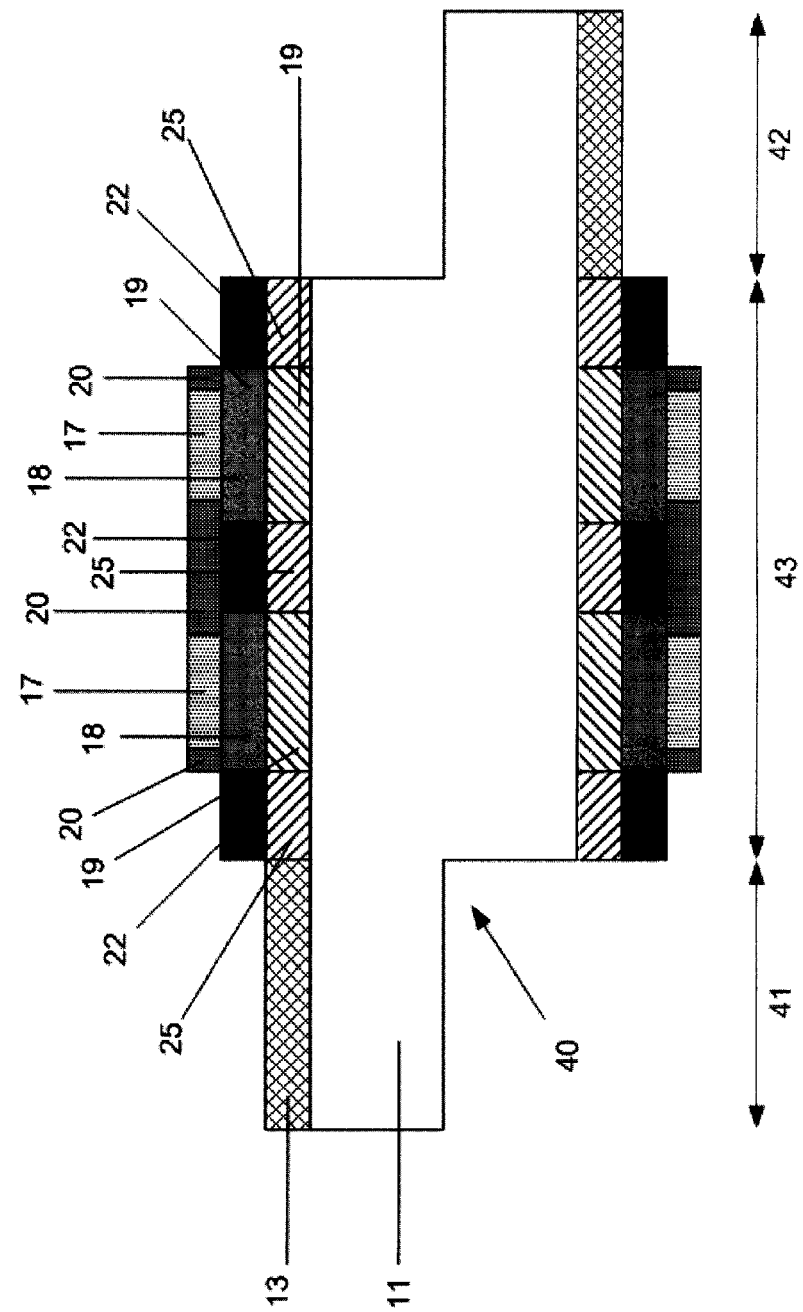
FIG. 5 is a front view of the separator plate shown in FIG. 4.

Referring to FIGS. 4 and 5, separator plate 40 is shown having a main body 43 and two heat exchange fins 41 and 42 extending from opposite sides of main body 43. The main body 43 consists of a main body of substrate 11 and flow field portions of the current collector layers 13 on first and second opposed major surfaces of the main body of the substrate 11 and contained within MEA sealing layer 20. Heat exchange fin 41 consists of (a) a first segment of substrate 11 extending from the main body of substrate 11 and having a major surface that is co-planar with the first major surface of the main body of substrate 11 and (b) a heat exchange portion of current collector layer 13 extending from the flow field portion on the first major surface of the main body of substrate 11 and onto the major surface of the first segment of substrate 11. Heat exchange fin 42 consists of (a) a second segment of substrate 11 extending from the main body of substrate 11 in an opposite direction to that of the first segment of substrate 11 and having a major surface that is co-planar with the second major surface of the main body of substrate 11 and (b) a heat exchange portion of current collector layer 13 extending from the flow field portion on the second major surface of the main body of substrate 11 and onto the major surface of the second segment of substrate 11. On each side of separator plate 40 the heat exchange portion is electrically and thermally connected to the flow field portion.

As previously discussed, the flow field portion of the current collector layer 13 is exposed to high humidity conditions surrounding the MEA. Accordingly, the flow field portion is comprised of a copper layer bonded to the substrate 11, a nickel layer deposited on the copper layer, and a gold layer deposited on the nickel layer. The gold layer provides low contact resistance, remains stable in the high humidity conditions surrounding the MEA, and protects the copper layer from corrosion. The nickel layer further enhances contact resistance and reduces corrosion. By contrast, the heat exchange portion of current collector layer 13 is isolated from the high humidity conditions surrounding the MEA by the MEA sealing layer 20. Accordingly, in the present embodiment the heat exchange layer is comprised solely of a copper layer. Alternatively, the heat exchange portion may comprise one or more thermally conductive materials known to one skilled in the art. In the further alternative, various other layers may be positioned between substrate 11 and the flow field portions and/or heat exchange portions of current collector layers 13.

In addition, the mechanical support provided by the substrate 11 permits a relatively thin layer of copper to be utilized as the heat exchange portion of the current collector layer 13. In the present embodiment, the copper layer has a thickness of 0.1 millimeters while the first and second segments of the substrate 11 that support the heat exchange portion have a thickness of one millimeter. It will be apparent to one skilled in the art that the thickness of the first and second segments of the substrate 11 may be varied depending on the materials utilized for the substrate 11 and heat exchange portions of the current collector layers 13 while still providing sufficient mechanical support to the heat exchange portion and separator plate 40.

Separator plate 40 is constructed such that the thickness of the portion of substrate 11 in each heat exchange fin 41 and 42 is half the thickness of the portion of substrate 11 in main body 43. This structure allows air to be blown between the heat exchange fins 41 and 42 of adjacent separator plates 40 in an assembled fuel cell stack as is further described below. Alternatively, greater or smaller thicknesses of the portions of substrate 11 in each heat exchange fin 41 and 42 may be selected as long as air can be blown between the heat exchange fins 41 and 42 of adjacent separator plates 40 in an assembled fuel cell stack.

In an assembled fuel cell, heat generated in the electrochemical reaction on the top side of separator plate 40 is conducted from the MEA, through the flow field portion on the top side of separator plate 40, and to the heat exchange portion in heat exchange fin 41. Similarly, heat generated in the electrochemical reaction on the bottom side of separator plate 40 is conducted from the MEA, through the flow field portion on the bottom side of separator plate 40, and to the heat exchange portion in heat exchange fin 42. The heat conducted to the heat exchange portions is then conducted to air that is blown over the fins by a cooling fan, thereby removing heat from the fuel cell. The rate of heat transfer from the fuel cell is dependent on 1) the thermal conductance of current collector layer 13 and heat exchange fins 41 and 42, 2) the surface area of heat exchange fins 41 and 42 that is exposed to air, 3) the temperature of the air, and 4) the speed and volume of air that is passed over the surface of heat exchange fins 41 and 42.

Separator plate 40 permits heat generated in the electrochemical reaction occurring in a fuel cell to be directed away from main body 43 and concentrated on the heat exchange portions of heat exchange fins 41 and 42. Since substrate 11 of separator plate 40 is an insulator, the majority of heat generated in the fuel cell with be conducted from the MEA, through the flow field portion, and to the heat exchange portions. Thus, the direction that heat may be conducted from the fuel cell can be controlled through the design of separator plate 40. This control permits cooling systems to be concentrated on locations about the fuel cell where the heat is being directed, thereby providing effective heat transfer from the fuel cell. In the present embodiment, heat exchange fins 41 and 42 are located on opposite sides of main body 43. Thus, the majority of heat generated from a fuel cell using separator plate 40 will be directed to these sides of main body 43. Cooling fans can be positioned to focus air on these sides of the fuel cell to maximize the heat transfer from the fuel cell.

Figure 6:
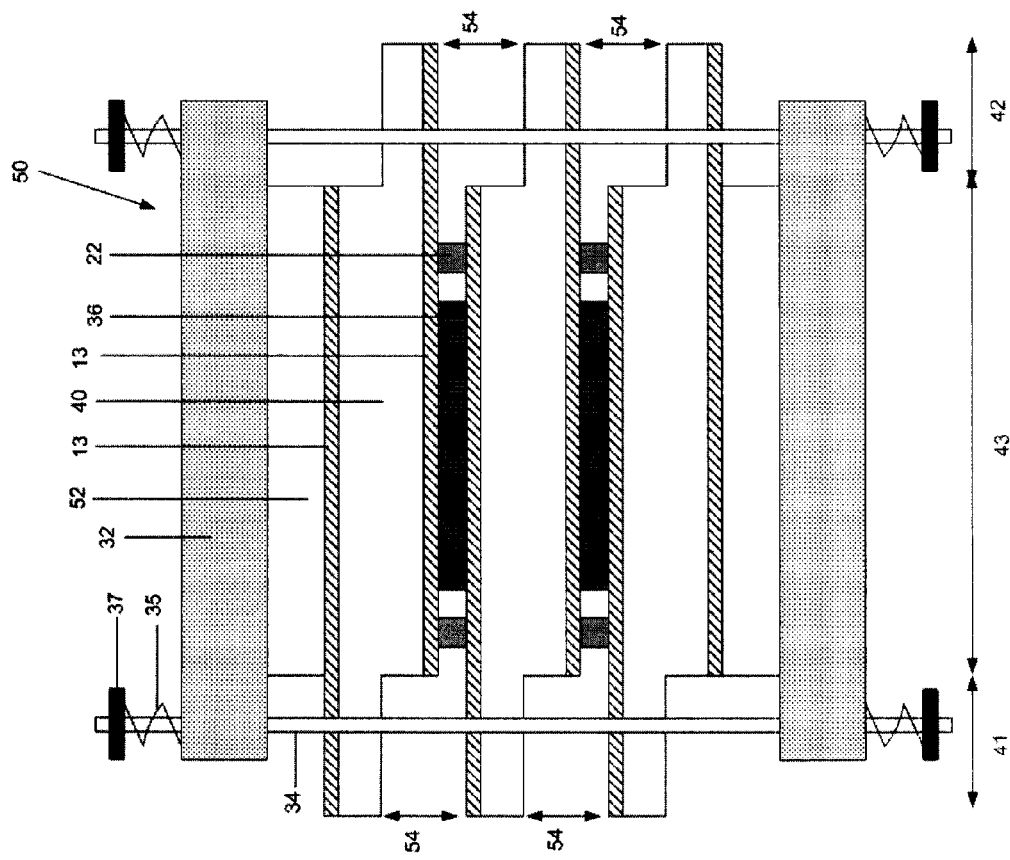
FIG. 6 is a front view of a fuel cell stack comprised of a plurality of separator plates shown in FIG. 4.

Referring to FIG. 6, a fuel cell stack 50 is shown similar to fuel cell stack 30, except for the use of a plurality of separator plates 40 in place of separator plates 10 and the addition of two compression plates 52. Compression plates 52 serve to assist in the compression of fuel cell stack 50. They are manufactured using well established PCB technology and are comprised of epoxy and glass fibre. It can be seen from FIG. 6 that separator plate 40 is shaped so as to create a space 54 between the heat exchange fins 41 and 42 of adjacent separator plates 40 in fuel cell stack 50. Cooling fans blow air through spaces 54 which transfers heat from heat exchange portions to the air, thereby conducting heat away from fuel cell stack 50. As discussed above, cooling fans are positioned to direct air at the sides of fuel cell stack 50 containing heat exchange fins 41 and 42 in order to maximize heat transfer from fuel cell stack 50.

The design parameters of a separator plate 40 and cooling fans required to conduct a desired amount of heat from a fuel cell stack are known and readily calculable by one skilled in the art. Given the properties of a fuel cell stack, one skilled in the art could readily calculate the dimensions and materials required for each heat exchange fin 41 and 42, as well as, the temperature and air mass flow rate required of air flowing across each heat exchange fin, in order to conduct a desired amount of heat from the fuel cell stack and maintain the fuel cell stack at a desired operating temperature.

For example, consider a fuel cell stack with separator plates 40 having the following properties:
Fuel cell stack
  stack output: 4 kilowatts
  number of fuel cells: 20 (each generating 200 watts)
  Separator plate main body:
    thickness: 5.5 mm (plus 0.25 mm for MEA sealing layer)
    power density: 1 watt/cm$^2$ (0.6 volts at 1.6 amps)
    flow field area: 200 cm$^2$ (10 cm*20 cm)
    flow field dimensions: 2 mm wide, 2 mm deep, and 300 cm long The fuel cell stack generates 4 kilowatts of heat during operation. In order to maintain the fuel cell stack at an operating temperature of 70° C., 4 kilowatts of heat must be conducted from the fuel cell stack. Heat exchange fins 41 and 42 with the following properties may be employed to conduct this amount of heat from the fuel cell stack:
  Separator plate heat exchange fins (each fin)
    dimensions: 5 cm wide, 1.5 mm thick, and 12 cm long
    current collector layer properties:
      copper layer: 1 ounce/ft$^2$
      nickel layer: 10 microns
      gold layer: 5 microns The air mass flow rate over each heat exchange fin required to conduct 100 watts of heat from the fuel cell stack is approximately 0.1 kg/s, for air at an ambient temperature of 25° C. Each heat exchange fin would effect a temperature rise of 20° C. in the passing air. To provide an air mass flow rate of 0.1 kg/s two 15 watt electronic cooling fans with 12 cm blades can be utilized, with each fan positioned on opposite sides of the fuel cell stack containing the heat exchange fins 41 and 42.

Heat Exchange Fluid Channel

In an alternative embodiment, a PCB separator plate 60 with an integrated heat exchange fluid channel is provided. Separator plate 60 is similar to separator plate 10 except as further described below.

Figure 7:
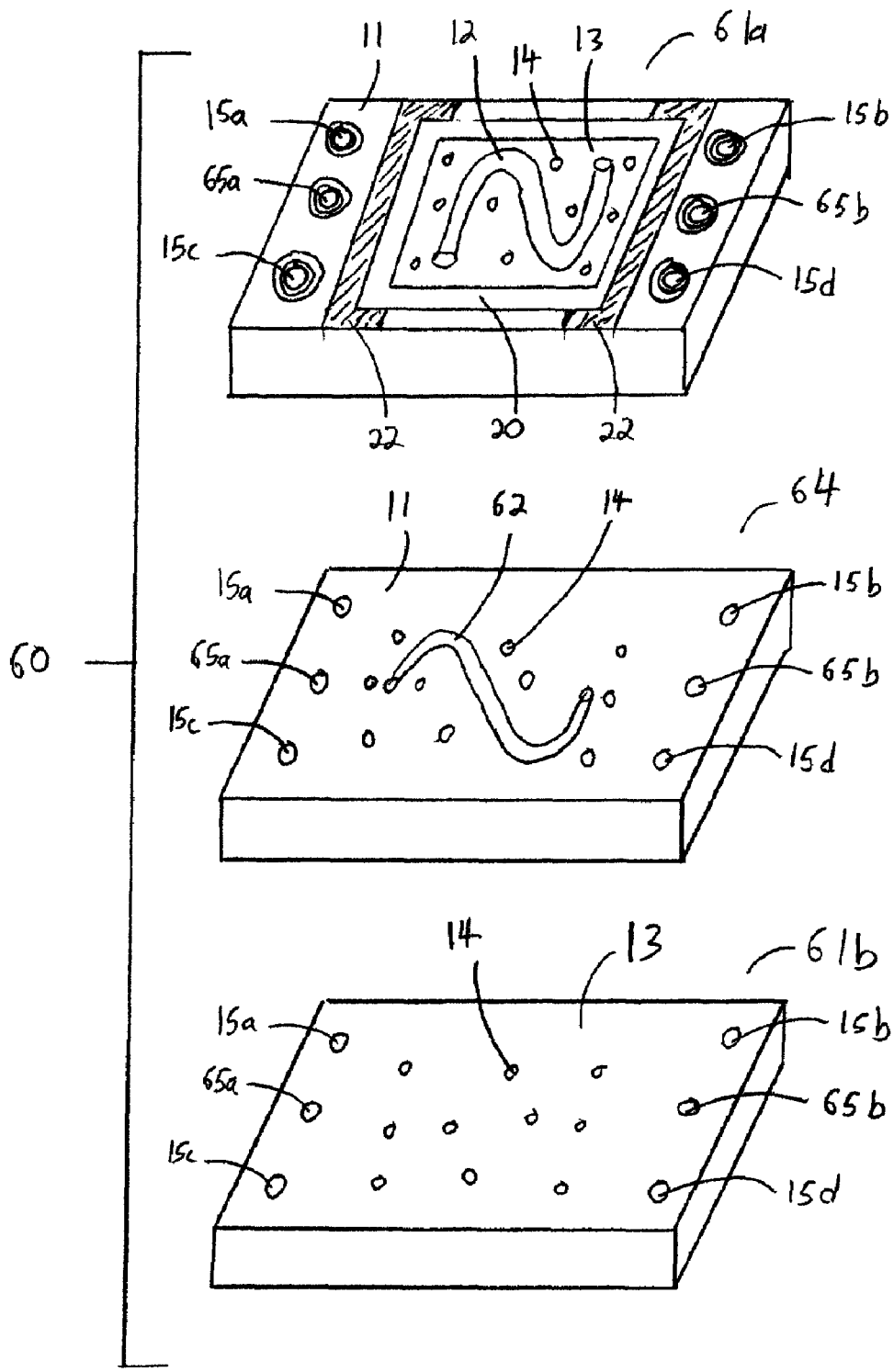
FIG. 7 is an exploded front perspective view of a separator plate for a fuel cell with an integrated heat exchange fluid channel shown in three portions.

Referring to FIG. 7, an exploded view of separator plate 60 is shown comprising a first portion 61a, second portion 61b and a third portion 64. During construction of separator plate 60, the bottom side of first portion 61a is bonded to the top side of third portion 64, and the top side of second portion 61b is bonded to the bottom side of third portion 64. Bonding between these portions is achieved using epoxy resin.

Referring to FIGS. 8a and 8b, first portion 61a of separator plate 60 is shown. First portion 61a comprises a substrate 11, four main reactant manifolds (15a, 15b, 15c, and 15d) and associated internal reactant manifolds, conductive vias 14 and two main coolant manifolds (65a and 65b). The top side of first portion 61a further comprises a current collector layer 13, a reactant flow field 12, MEA sealing layer 20, MEA bonding layer 22, and manifold sealing layers 17 and manifold bonding layers 18 associated with each main reactant manifold and main coolant manifold. The bottom side of first portion 61b further comprises a current collector layer 13 that is in electrical and thermal communication with current collector layer 13 of the top side of first portion 61a through conductive vias 14.

Main coolant manifolds 65a and 65b span through the thickness of first portion 61a and serve to: 1) provide coolant to the fuel cell and remove used coolant from the fuel cell, 2) provide coolant to and remove used coolant from similar coolant manifolds of adjacent separator plates 60, and 3) interface with external coolant supply systems. In particular, main coolant manifold 65a provides coolant to separator plate 60 and main coolant manifold 65b removes used coolant from separator plate 60. Main coolant manifolds 65a and 65b are discussed in further detail below. In the present embodiment, the coolant is water. Alternatively, other forms of coolant may be used that are known to one skilled in the art.

Referring to FIGS. 10a and 10b, second portion 61b of separator plate 60 is shown. Second portion 61b is identical to first portion 61a except that the top side of first portion 61a is the bottom side of second portion 61b and the bottom side of first portion 61a is the top side of second portion 61b.

Referring to FIGS. 9a and 9b, third portion 64 of separator plate 60 is shown. Third portion 64 is comprised of a substrate 11, conductive vias 14, four main reactant manifolds (15a, 15b, 15c, and 15d), two main coolant manifolds (65a and 65b) and two internal coolant manifolds (66a and 66b), and a fluid channel 62 in each of the top and bottom sides of third portion 64. Conductive vias 14 are electrically and thermally connected to conductive vias 14 of first portion 61a and second portion 61b, such that current collector layer 13 of first portion 61a is electrically and thermally connected to current collector layer 13 of second portion 61b.

Fluid channels 62 are formed by engraving one or more open channels into the surface of substrate 11 that are adapted to carry coolant. Fluid channels 62 are typically a few millimeters wide and deep, and a few meters long. In the present embodiment, the width of the fluid channels 62 is two millimeters, the depth is 2 millimeters, and the length is three meters. The fluid channels 62 can be serpentine with multiple bends or have other configurations as is know to one skilled in the art. Coolant is delivered to and removed from fluid channel 62 through main coolant manifolds 65a and 65b and internal manifolds 66a and 66b. In the present embodiment, main coolant manifold 65a provides coolant to both fluid channels 62 through internal coolant manifold 66a, while main coolant manifold 65b removes used coolant from both fluid channels 62 through internal coolant manifold 66b. Main coolant manifolds 65a and 65b and internal coolant manifolds 66a and 66b are constructed in a similar manner as main reactant manifolds (15a, 15b, 15c, and 15d) and internal reactant manifolds (24a, 24b, 24c and 24d) discussed above.

In an assembled fuel cell, heat generated in the electrochemical reaction on the top side of separator plate 60 is conducted from the MEA, through current collector layer 13 on the top side of first portion 61a, through conductive vias 14, and to current collector layer 13 on the bottom side of first portion 61a. Heat in current collector layer 13 is them conducted to coolant running through fluid channel 62 on the top side of second portion 64. Similarly, heat generated in the electrochemical reaction on the bottom side of separator plate 60 is conducted from the MEA, through current collector layer 13 on the bottom side of second portion 61b, through conductive vias 14, and to current collector layer 13 on the top side of second portion 61b. Heat in current collector layer 13 is then conducted to coolant running through fluid channel 62 on the bottom side of second portion 64. In both cases, the heated coolant is directed through coolant manifold 65b out of the fuel cell and to an external heat exchanger.

The rate of heat transfer from the fuel cell is dependent on 1) the thermal conductance of current collector layer 13, 2) the dimensions of fluid channels 62 and thus the surface area of coolant in contact with current collector layer 13, 3) the heat capacity and thermal conductance of the coolant, 4) the rate at which coolant is passed through fluid channels 62.

In an alternative embodiment, reactants are preheated in fluid channels similar to fluid channels 62 before entering flow fields 12. Reactants are directed through main reactant manifolds 15a and 15c, through internal reactants manifolds, and to the fluid channels 62 where the reactants are heated in a similar manner as described for coolant above. The preheated reactants are then directed to flow fields 12 through internal manifolds 24a and 24c.

Heat Exchange Manifolds

In an alternative embodiment, a PCB separator plate 70 with an integrated heat exchange manifold provided. Separator plate 70 is similar to separator plate 10 except as further described below.

Referring to FIGS. 11a and 11b, separator plate 70 is shown having six heat exchange manifolds (75a, 75b, 75c, 75d, 75e, and 75f) that run through the thickness of separator plate 70. The manifolds serve to: 1) heat reactants flowing through the manifold, 2) provide heated reactants to the fuel cell, 2) provide heated reactants to similar heat exchange manifolds of adjacent separator plates 70, and 3) interface with external reactant supply systems. The manifolds are formed by drilling holes through the thickness of substrate 11.

About the perimeter of each manifold is current collector layer 13 and manifold sealing layer 17 deposited on current collector layer 13. In addition, manifold base layer 19 and manifold bonding layer 18 are located slightly away from and about a portion of the perimeter of sealing layer 17, such that manifold base layer 19 and manifold bonding layer 18 are electrically isolated from current collector 13.

Each heat exchange manifold further comprises a conductive lining (76a, 76b and 76c) comprised of gold and nickel that is plated onto the inner surface of the manifold. The conductive lining is electrically and thermally connected to current collector layer 13 about the perimeter of each manifold. In an assembled fuel cell, manifold sealing layer 17 electrically isolates the conductive lining from the conductive lining of heat exchange manifolds in adjacent separator plates 70. Since the conductive lining is electrically coupled to current collector layer 13, electrical isolation of the conductive lining in adjacent manifolds is necessary to avoid shorting the anode and cathode in the fuel cell.

In an assembled fuel cell, heat generated in the electrochemical reactions on the top and bottom sides of separator plate 70 is conducted from the MEAs, through the current collector layer 13, and to the conductive lining (76a, 76b and 76c) of the heat exchange manifolds. The heat conducted to the conductive lining is then conducted to reactants in the heat exchange manifold, thereby pre-heating the reactants prior to the reactants entering flow fields.

Referring to FIG. 12, a cross section of a fuel cell stack 80 is shown similar to fuel cell stack 30, except for the use of separator plates 70 in place of separator plates 10 and the addition of two manifold plates 82. Manifold plates 82 are manufactured using well established PCB technology and are comprised of epoxy and glass fibre.

Like manifolds in the separator plates 70 form an extended manifold running through the thickness of fuel cell stack 80. The manifold plates 82 serve to connect adjacent extended manifolds carrying like reactants in such a manner that the path of reactant flow proceeds up and down the thickness of fuel cell stack 80 multiple times before the reactants are provided to flow fields 12. In the present embodiment, the extended manifold relating to heat exchange manifold 75a is connected to the extended manifold relating to heat exchange manifold 75b in the bottom manifold plate 82, and the extended manifold relating to heat exchange manifold 75b is connected to the extended manifold relating to heat exchange manifold 75c in the top manifold plate 82. In this manner, reactants are heated by the conductive lining of multiple heat exchange manifolds before heat exchange manifold 75c directs the reactants to flow fields 12 through internal reactant manifolds 24a.

In an alternative embodiment, heat exchange manifolds are used to direct coolant through the separator plates up and down the thickness of the fuel cell stack. The heated coolant is then directed out of the fuel cell stack and to an external heat exchanger.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the claims appended to the patent.

I claim:

1. A fuel cell separator plate comprising:
   (a) a planar substrate comprising a main body having first and second opposed major surfaces, a first open channel recessed in the first major surface, and a first segment extending from the main body;
   (b) a thermally and electrically conductive first current collector layer on the first major surface of the main body, the first current collector layer having a flow field portion and a heat exchange portion extending from the flow field portion onto the first segment such that heat in the flow field portion conducts to the heat exchange portion during fuel cell use;
   (c) a second open channel forming part of the substrate and recessed in the second major surface of the main body, and a second segment forming part of the substrate and extending from the main body; and
   (d) a thermally and electrically conductive second current collector layer having a flow field portion on the second major surface of the main body and a heat exchange portion extending from the flow field portion onto the second segment such that heat in the flow field portion conducts to the heat exchange portion during fuel cell use
   wherein the materials and dimensions of the substrate are selected to provide sufficient mechanical support for the separator plate during fuel cell use and to serve as a thermal and electrical insulator, the first and second segments each have a thickness less than the thickness of the main body, and wherein the first segment has a major surface that is co-planar with the first major surface of the main body and the second segment has a major surface that is co-planar with the second major surface of the substrate, such that when the planar substrate is stacked adjacent to another planar substrate a space is formed in a stack direction between overlapping segments of the two substrates.

2. The fuel cell separator plate in claim 1 wherein the first and second segments extend from the main body in opposite directions.

3. The fuel cell separator plate in claim 1 wherein the first and second segments extend from the main body in the same direction and wherein the dimensions of the first and second segments are selected such that the first and second segments are non-overlapping in the stack direction.

4. The fuel cell separator plate in claim 1 wherein the each of the first and second segments comprise a plurality of segments extending from the main body.

5. The fuel cell separator plate in claim 1 wherein the flow field portion of the first and second current collector layers is comprised of a different material composition than the heat exchange portion of the first and second current collector layers.

6. The fuel cell separator plate in claim 1 further comprising conductive vias extending through the thickness of the substrate in electrical and thermal connection with the flow field portions of the first and second current collector layers.

7. A fuel cell separator plate comprising:
   (a) a planar substrate comprising a main body having first and second opposed major surfaces, a first open channel recessed in the first major surface, and a first segment extending from the main body; and
   (b) a thermally and electrically conductive first current collector layer on the first major surface of the main body, the first current collector layer having a flow field portion and a heat exchange portion extending from the flow field portion onto the first segment such that heat in the flow field portion conducts to the heat exchange portion during fuel cell use
   wherein the materials and dimensions of the substrate are selected to provide sufficient mechanical support for the separator plate during fuel cell use and to serve as a thermal and electrical insulator, and the flow field portion of the first current collector layer is comprised of a different material composition than the heat exchange portion of the first current collector layer.

8. A fuel cell separator plate comprising:
   (a) a planar substrate comprising a main body having first and second opposed major surfaces, a first open channel recessed in the first major surface, and a first segment extending from the main body;
   (b) a thermally and electrically conductive first current collector layer on the first major surface of the main body, the first current collector layer having a flow field portion and a heat exchange portion extending from the flow field portion onto the first segment such that heat in the flow field portion conducts to the heat exchange portion during fuel cell use;
   (c) a second open channel forming part of the substrate and recessed in the second major surface of the main body; and
   (d) a thermally and electrically conductive second current collector layer on the second major surface of the main body, the second current collector layer having a flow field portion and a heat exchange portion extending from the flow field portion onto the first segment such that heat in the flow field portion conducts to the heat exchange portion during fuel cell use
   wherein the materials and dimensions of the substrate are selected to provide sufficient mechanical support for the separator plate during fuel cell use and to serve as a thermal and electrical insulator, and the flow field portion of the first and second current collector layers is comprised of a different material composition than the heat exchange portion of the first and second current collector layers.

9. A fuel cell separator plate comprising:
   (a) a planar substrate comprising a main body having first and second opposed major surfaces, a first open channel recessed in the first major surface, and a first segment extending from the main body; and
   (b) a thermally and electrically conductive first current collector layer on the first major surface of the main body, the first current collector layer having a flow field portion and a heat exchange portion extending from the flow field portion onto the first segment such that heat in the flow field portion conducts to the heat exchange portion during fuel cell use;

(c) a second open channel forming part of the substrate and recessed in the second major surface of the main body, and a second segment forming part of the substrate and extending from the main body; and (d) a thermally and electrically conductive second current collector layer on the second major surface of the main body, the second current collector layer having a flow field portion and a heat exchange portion extending from the flow field portion onto the second segment such that heat in the flow field portion conducts to the heat exchange portion during fuel cell use wherein, the materials and dimensions of the substrate are selected to provide sufficient mechanical support for the separator plate during fuel cell use and to serve as a thermal and electrical insulator, and the flow field portion of the first and second current collector layers is comprised of a different material composition than the heat exchange portion of the first and second current collector layers.

* * * * *